United States Patent
Mase et al.

(10) Patent No.: US 11,214,247 B2
(45) Date of Patent: Jan. 4, 2022

(54) VEHICLE CONTROL DEVICE

(71) Applicant: TOYOTA JIDOSHA KABUSHIKI KAISHA, Aichi-ken (JP)

(72) Inventors: Yusuke Mase, Nagoya (JP); Shoichi Inaba, Nagoya (JP); Kazuki Mori, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 143 days.

(21) Appl. No.: 16/841,683

(22) Filed: Apr. 7, 2020

(65) Prior Publication Data
US 2020/0339115 A1    Oct. 29, 2020

(30) Foreign Application Priority Data

Apr. 26, 2019   (JP) .............................. JP2019-085459

(51) Int. Cl.
*B60W 30/08*   (2012.01)
*B60W 30/095*  (2012.01)
*B60W 10/30*   (2006.01)

(52) U.S. Cl.
CPC ........ *B60W 30/0953* (2013.01); *B60W 10/30* (2013.01); *B60W 2554/802* (2020.02); *B60W 2554/804* (2020.02)

(58) Field of Classification Search
CPC .......................................... B60W 30/08–0956
See application file for complete search history.

(56) References Cited

U.S. PATENT DOCUMENTS

| 8,140,210 B2* | 3/2012 | Randler ................ G01S 13/726 |
| | | 701/27 |
| 8,902,103 B2* | 12/2014 | Kim ...................... G01S 13/931 |
| | | 342/70 |
| 9,421,931 B2* | 8/2016 | Wellhoefer ......... B60R 21/0134 |
| 10,366,603 B2* | 7/2019 | Ohta ......................... B60Q 1/04 |
| 10,672,275 B2* | 6/2020 | Minemura ............ B60W 30/09 |
| 10,713,508 B1* | 7/2020 | Diehl ...................... G01S 17/66 |
| 10,752,218 B2* | 8/2020 | Turner .................... B60R 11/04 |
| 11,016,492 B2* | 5/2021 | Gier ..................... G05D 1/0257 |
| 11,119,478 B2* | 9/2021 | McArthur ............. G01S 13/862 |

(Continued)

FOREIGN PATENT DOCUMENTS

| JP | 2007-511743 A | 5/2007 |
| JP | 2010-71805 A | 4/2010 |

(Continued)

*Primary Examiner* — Jonathan M Dager
(74) *Attorney, Agent, or Firm* — Hauptman Ham, LLP

(57) ABSTRACT

The vehicle control device includes a target detection sensor and a control device that controls the operation of actuators. The target detection sensor can detect the relative speed of a target, positioned in a detectable area, with respect to the vehicle but cannot detect the relative speed when the target exists in a short distance area. The control device calculates the change amount of the relative speed per unit time. When the target enters the short-distance region, the control device calculates the estimated relative speed based on the elapsed time from the last acquisition time, which is the time when the relative speed of the target was last acquired from the target detection sensor, to the current time, the last acquired relative speed that is the relative speed of the target at the last acquisition time, and the time rate of change.

5 Claims, 6 Drawing Sheets

(56) References Cited

U.S. PATENT DOCUMENTS

| | | | | |
|---|---|---|---|---|
| 11,124,143 | B1* | 9/2021 | Pertsel | B60N 2/02 |
| 2006/0164218 | A1* | 7/2006 | Kuttenberger | G01S 13/931 |
| | | | | 340/435 |
| 2007/0035113 | A1* | 2/2007 | Kuttenberger | B60R 21/013 |
| | | | | 280/735 |
| 2009/0012684 | A1* | 1/2009 | Thiele | B60T 7/22 |
| | | | | 701/70 |
| 2010/0094508 | A1* | 4/2010 | Kozyreff | G01S 13/87 |
| | | | | 701/45 |
| 2016/0282468 | A1* | 9/2016 | Gruver | G01S 7/4813 |
| 2018/0149742 | A1* | 5/2018 | Izadian | H01Q 1/1264 |
| 2019/0049577 | A1* | 2/2019 | Iida | G01S 7/032 |
| 2019/0346557 | A1* | 11/2019 | Baba | B60T 7/22 |
| 2020/0064483 | A1* | 2/2020 | Li | G01S 7/4034 |
| 2021/0318444 | A1* | 10/2021 | Li | G01S 17/86 |

FOREIGN PATENT DOCUMENTS

| | | | |
|---|---|---|---|
| JP | 2017-9526 | A | 1/2017 |
| JP | 2017-109655 | A | 6/2017 |
| JP | 2017-171030 | A | 9/2017 |
| JP | 2018-187957 | A | 11/2018 |
| JP | 2019-2689 | A | 1/2019 |

\* cited by examiner

VEHICLE CONTROL DEVICE

INCORPORATION BY REFERENCE

The disclosure of Japanese Patent Application No. 2019-085459 filed on Apr. 26, 2019 including the specification, drawings and abstract is incorporated herein by reference in its entirety.

BACKGROUND

1. Technical Field

The present disclosure relates to a vehicle control device that estimates the relative velocity of a target with respect to a vehicle when the distance between the target and the vehicle becomes less than a predetermined distance and, based on the estimated relative velocity, controls the operation of the actuators mounted on the vehicle.

2. Description of Related Art

A conventional radar device (radar sensor) cannot detect a target when the target enters a short-distance area where the distance from the radar device to the target is less than a predetermined minimum detection distance. To address this problem, one of the vehicle control devices (hereinafter referred to as a "first conventional device") using a radar device estimates the position of such a target by extrapolation processing and, based on the estimation result, determines whether the target exists (see, for example, Japanese Unexamined Patent Application Publication No. 2010-71805 (JP 2010-71805 A)).

Another vehicle control device using a radar device (hereinafter referred to as a "second conventional device") estimates the current position of a target based the "position of the target relative to the vehicle and the relative velocity of the target relative to the vehicle" last detected by the radar device. Furthermore, the second conventional device converts the last-detected relative velocity into the relative velocity in the current coordinate system and uses the converted relative velocity that is converted (converted relative velocity) as the current relative velocity (Japanese Unexamined Patent Application Publication No. 2019-2689 (JP 2019-2689 A)).

SUMMARY

However, when a target is positioned in the short-distance area described above, the vehicle is likely to decelerate to avoid a collision with the target and, therefore, the target is less likely to maintain the above relative velocity. Therefore, the "second conventional device that employs the above-described converted relative velocity as the current relative velocity" cannot accurately estimate the relative velocity of a target positioned in the short-distance area and, as a result, there is a high possibility that the second conventional device cannot appropriately control the actuators.

The present disclosure provides a vehicle control device that can more accurately estimate the relative velocity of a target existing in the short-distance area.

A first aspect of the present disclosure relates to a vehicle control device (hereinafter also referred to as a "present disclosure device") including a target detection sensor (12) and a control device (10). The target detection sensor, provided at a predetermined position on a vehicle, is configured to be able to detect both a distance (L) between a target and the vehicle and the relative velocity (Vr) of the target with respect to the vehicle when the target exists in a detectable area (DA) but is not able to detect at least the relative velocity of the target with respect to the vehicle when the target exists in a short-distance area (NDA). The detectable area is a part of a predetermined area around the vehicle and is equal to or more than a predetermined minimum detection distance (Lmin) from the predetermined position and less than a predetermined maximum detection distance (Lmax) that is more than the minimum detection distance. The short-distance area is less than the minimum detection distance from the predetermined position. The control device is configured to control the operation of actuators (42a to 42f, 52a to 52d, 60a to 60d) mounted on the vehicle.

In addition, the control device is configured to acquire the distance and the relative velocity of the target existing in the detectable area from the target detection sensor every time a predetermined time elapses (step 405), calculate the time rate of change (slope a) corresponding to the change amount per unit time of the relative velocity of the target based on the history of the acquired relative velocity (step 620), and calculate the current-time relative velocity of the target that has entered the short-distance area with respect to the vehicle as an estimated relative velocity (step 630) when the target positioned in the detectable area has entered the short-distance area (step 615 "Yes"). The estimated relative velocity is calculated based on an elapsed time from a last acquisition time (t_last) to the current time wherein the last acquisition time is a time when the relative velocity of the target detected by the target detection sensor was last acquired from the target detection sensor, a last acquired relative velocity (Vr_last) that is the relative velocity of the target acquired from the target detection sensor at the last acquisition time, and the time rate of change. In addition, the control device is configured to control the operation of the actuators based on the estimated relative velocity (step 650, step 730).

In this configuration, since the relative velocity of a target existing in the short-distance area can be calculated based on the time rate of change of the relative velocity that is calculated based on the history of the relative velocity during the period when the target was in the detectable area, the estimated relative velocity of the target existing in the short-distance area can be calculated accurately. Therefore, the actuators can be appropriately controlled based on the estimated relative velocity.

In the vehicle control device according to the first aspect, when a collision condition that is satisfied when the possibility that the target and the vehicle will collide is high is satisfied (step 715 "Yes"), the control device may be configured to calculate the estimated relative velocity as a collision-time estimated relative velocity based on the time rate of change, the last acquired relative velocity, and a time from the last acquisition time to a collision time when the collision condition was satisfied (step 720), and may be configured to determine whether to operate the actuators based on the collision-time estimated relative velocity (step 725).

Since a target is likely to exist in the short-distance area at a collision time, the target detection sensor cannot detect the relative velocity of the target. According to the above aspect, since the collision-time estimated relative velocity of the target at the collision time is calculated based on the time rate of change, the last acquired relative velocity, and the "time from the last acquisition to the collision time", the collision-time estimated relative velocity can be calculated more accurately.

In the vehicle control device according to the first aspect, when the collision condition is determined to be satisfied (step 715 "Yes"), the control device may be configured to calculate the collision-time estimated relative velocity based on the time rate of change, the last acquired relative velocity, the time from the last acquisition time to the collision time when the collision condition was satisfied, and the delay time (T3) required to acquire the latest value of the distance and the latest value of the relative velocity from the target detection sensor (step 720).

In this configuration, since the collision-time estimated relative velocity is calculated in consideration of the delay time, the collision-time estimated relative velocity can be calculated more accurately.

The vehicle control device according to the first aspect may further include an impact detection sensor (16, 18) for detecting the impact index value (Gx, P) indicating an impact force acting on the vehicle. The control device may be configured to determine that the collision condition is satisfied when the impact index value is equal to or more than a first threshold (step 715, "Yes").

In this configuration, it is possible to more accurately determine whether the collision condition is satisfied.

In the vehicle control device according to the first aspect, when the collision-time estimated relative velocity is more than a predetermined threshold speed and, after the collision time, the impact index value becomes equal to or more than a second threshold value that is more than the first threshold value (step 725 "Yes"), the control device may be configured to operate inflators that activate airbags mounted on the vehicle as the actuators (step 730).

In this configuration, when the collision-time estimated relative velocity is more than the threshold velocity and the impact index value is equal to or more than the second threshold that is more than the first threshold after the collision time, the "inflators for activating the airbags" are activated. Therefore, even when the target detection sensor fails due to a collision between the target and the vehicle, the airbags can be activated properly.

In the above description, parenthesized names and/or reference numerals used in an embodiment are attached to the configuration of the disclosure corresponding to the embodiment that will be described later in order to help the understanding of the present disclosure. However, the components of the present disclosure are not limited by the embodiment defined by the names and/or reference numerals. Other objects, other features, and attendant advantages of the present disclosure will be readily understood from the description of the embodiment of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
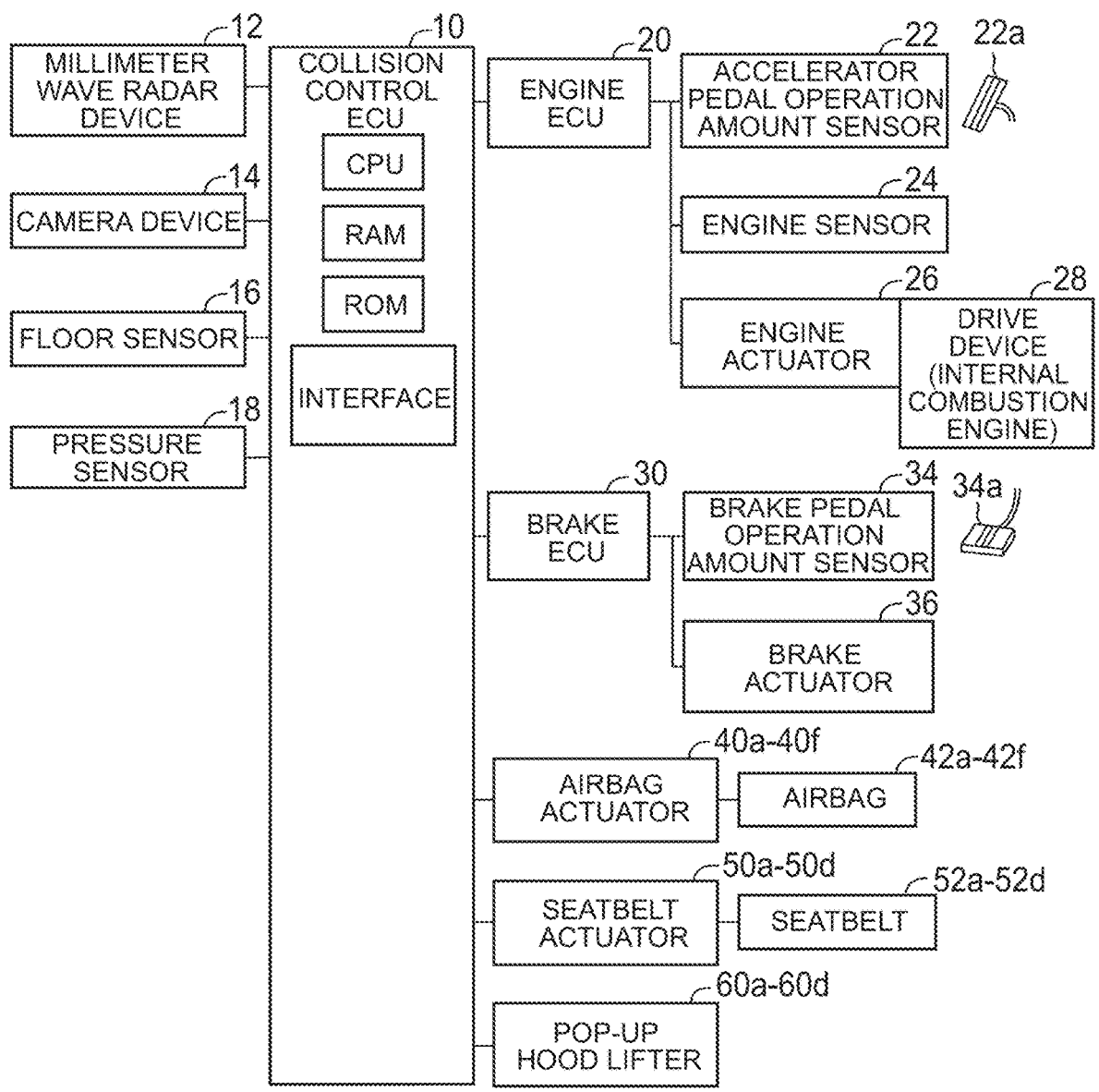
FIG. 1 is a schematic diagram showing a system configuration of a vehicle control device (present control device) according to an embodiment of the present disclosure.

A vehicle control device according to one embodiment of the present disclosure (hereinafter referred to as a "present control device") is applied to a vehicle VA (see FIG. 2). The present control device is built in a collision prevention safety device mounted on the vehicle VA. The collision prevention safety device includes a collision control ECU (hereinafter referred to as a "CCECU") 10, an engine ECU 20, and a brake ECU 30. These ECUs are connected to each other so that data can be exchanged (communicable) via a controller area network (CAN) (not shown).

An ECU, an abbreviation for an electronic control unit, is an electronic control circuit having a microcomputer, which includes a CPU, a ROM, a RAM, an interface, and the like, as its main components. The CPU implements various functions by executing instructions (routines) stored in the memory (ROM). These ECUs or several of them may be integrated into one ECU.

The vehicle VA includes a millimeter wave radar device 12, a camera device 14, a floor sensor 16, a pressure sensor 18, an accelerator pedal operation amount sensor 22, an accelerator pedal 22a, an engine sensor 24, an engine actuator 26, a drive device (internal combustion engine) 28, a brake pedal operation amount sensor 34, a brake pedal 34a, a brake actuator 36, a plurality of airbag actuators 40a to 40f, a plurality of airbags 42a to 42f, a plurality of seatbelt actuators 50a to 50d, a plurality of seatbelts 52a to 52d, and pop-up hood lifters 60a to 60d.

The millimeter wave radar device 12, camera device 14, floor sensor 16, and pressure sensor 18 are connected to the CCECU 10.

The millimeter wave radar device 12 is a well-known target detection sensor that detects a target by sending the millimeter wave in front of the vehicle VA and by receiving the millimeter wave (reflected wave) reflected by the target. Furthermore, based on the received reflected wave, the millimeter wave radar device calculates the distance (target distance) L to the target, the relative velocity (target relative velocity) Vr of the target with respect to the vehicle VA, and the direction of the target. This millimeter wave radar device 12 employs the FM-CW system. The details of the millimeter wave radar device 12 are described in Japanese Unexamined Patent Application Publication No. 2017-9526 (JP 2017-9526 A) and the like.

Figure 2:
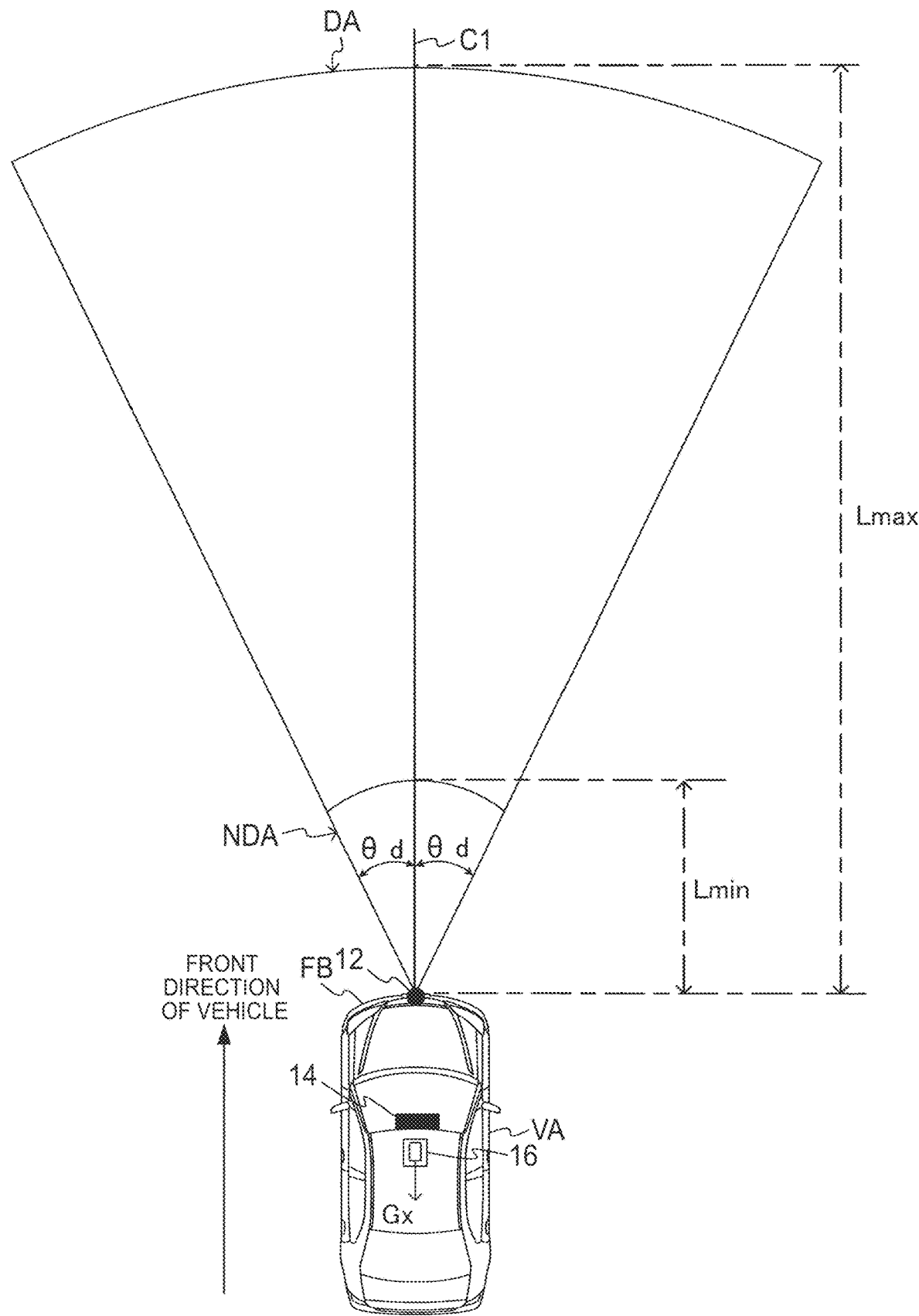
FIG. 2 is a vehicle's top view showing the detection range of the millimeter wave radar device shown in FIG. 1.

As shown in FIG. 2, the millimeter wave radar device 12 is provided at the front end, and at the center in the vehicle width direction, of the vehicle VA (front end center). The millimeter wave radar device 12 sends the millimeter wave propagating to the area that has a predetermined angle θd in the left direction and in the right direction from "the center axis Cl extending in the forward direction of the vehicle VA from the front end center" and that extends to the maximum detection distance Lmax from the front end center. Therefore, the millimeter wave radar device 12 can calculate the distance L, the relative velocity Vr, and the direction of a target existing in that area. However, the millimeter wave radar device 12 cannot detect a target existing in the area NDA (hereinafter also referred to as a "short-distance area" or "non-detection area") that is less than the minimum detection distance Lmin from the front end center (that is, the distance L, relative velocity Vr, and direction of the target cannot be detected). Therefore, the millimeter wave radar device 12 detects the distance L and the relative velocity Vr of a target existing in the detectable area DA that is equal to or more than the minimum detection distance Lmin, and less than the maximum detection distance Lmax, from the front end center. The millimeter wave radar device 12 sends the detected distance L, relative velocity Vr, and direction to the CCECU 10 as the radar target information every time a predetermined time elapses.

The camera device 14 is provided at the upper center on the windshield in the vehicle cabin of the vehicle VA to acquire the image obtained by capturing the area in front of the vehicle VA (hereinafter also referred to as a "front image"). From the front image, the camera device 14 acquires "the distance to a target, the direction of the target, the position of the white line on the road with respect to the vehicle VA". The camera device 14 sends the acquired information to the CCECU 10 as the camera target information every time a predetermined time elapses.

The CCECU 10 acquires (determines) the final target information by correcting the radar target information based on the camera target information.

The floor sensor 16 is fixed on the floor of the vehicle cabin of the vehicle VA (that is, on the vehicle body floor component at the center of the vehicle body). The floor sensor 16 detects the vehicle longitudinal acceleration (hereinafter referred to as "floor acceleration Gx") acting on the sensor itself and sends the detection signal, which indicates the floor acceleration Gx, to the CCECU 10. The floor acceleration Gx is set to a value that expresses a backward acceleration of the vehicle VA (deceleration) as a positive value.

The pressure sensor 18 detects the pressure P inside the chamber (not shown) in the front bumper FB (see FIG. 2) of the vehicle VA and sends the detection signal, which indicates the pressure P, to the CCECU 10.

The engine ECU 20 is connected to the accelerator pedal operation amount sensor 22 and the engine sensor 24 and receives the detection signals of these sensors.

The accelerator pedal operation amount sensor 22 sends the detection signal, which indicates the operation amount of the accelerator pedal 22a of the vehicle VA (accelerator pedal operation amount), to the engine ECU 20. The engine sensor 24 is a sensor that detects the operation state amount of the internal combustion engine 28. The internal combustion engine 28 is, for example, a throttle valve opening degree sensor, an engine rotation speed sensor, an intake air amount sensor, or the like.

Furthermore, the engine ECU 20 is connected to the engine actuator 26 such as a "throttle valve actuator and fuel injection valve". The engine ECU 20 drives the engine actuator 26 to change the torque generated by the internal combustion engine 28. The engine ECU 20 determines the target throttle valve opening degree TAtgt, which increases as the accelerator pedal operation amount increases, and controls the engine actuator 26 so that the actual throttle valve opening degree matches the target throttle valve opening degree TAtgt.

The brake ECU 30 is connected to the brake pedal operation amount sensor 34 and the brake actuator 36 that is a hydraulic control actuator. The brake pedal operation amount sensor 34 sends the detection signal, which indicates the operation amount of the brake pedal 34a of the vehicle VA (brake pedal operation amount), to the brake ECU 30.

The brake actuator 36 is provided in the hydraulic circuit (not shown) provided between the "master cylinder (not shown) that pressurizes hydraulic oil by the pedal force of the brake pedal 34a" and the "friction brake device (not shown) including the known wheel cylinder provided on each wheel". Furthermore, the brake actuator 36 adjusts the hydraulic pressure supplied to the wheel cylinders.

The brake ECU 30 determines a larger operation required deceleration Gbpd as the brake pedal operation amount becomes larger and, based on the operation required deceleration Gbpd, drives the brake actuator 36 to control the hydraulic pressure of the hydraulic oil supplied to the wheel cylinders. As a result, the braking force (friction braking force) adjusted for each wheel is generated, so that the actual deceleration (negative acceleration) of the vehicle VA matches the operation required deceleration Gbpd.

Each of the airbag actuators 40a to 40f, connected to the CCECU 10, is an actuator that operates the inflator (not shown) for inflating the corresponding airbag 42a to 42f. The airbags 42a to 42f in this example are provided at six locations, namely, in front of the driver's seat, to the right side of the driver's seat, in front of the front passenger seat, to the left side of the front passenger seat, to the left side of the rear seat, and to the right side of the rear seat.

Each of the seatbelt actuators 50a to 50d is an actuator that retracts the corresponding seatbelt 52a to 52d in response to an instruction from the CCECU 10 to remove a slack in the seatbelt 52a to 52d. The seatbelts 52a to 52d are provided in the driver's seat, front passenger seat, left rear seat, and right rear seat.

The pop-up hood lifters 60a to 60d are provided at locations corresponding to the four corners of the hood (not shown) of the vehicle VA. When a target and the vehicle VA collide, the pop-up hood lifters 60a to 60d operate so as to lift the hood in response to an instruction from the CCECU 10. As a result, a space is secured between the hood and an engine compartment (not shown), so that the impact on the target at collision time is reduced. Details of the pop-up hood lifters 60a to 60d are described in Japanese Unexamined Patent Application Publication No. 2018-187957 (JP 2018-187957 A), Japanese Unexamined Patent Application Publication No. 2017-171030 (JP 2017-17 1030 A), and Japanese Unexamined Patent Application Publication No. 2017-109655 (JP 2017-109655 A).

Outline of Operation

Figure 3:
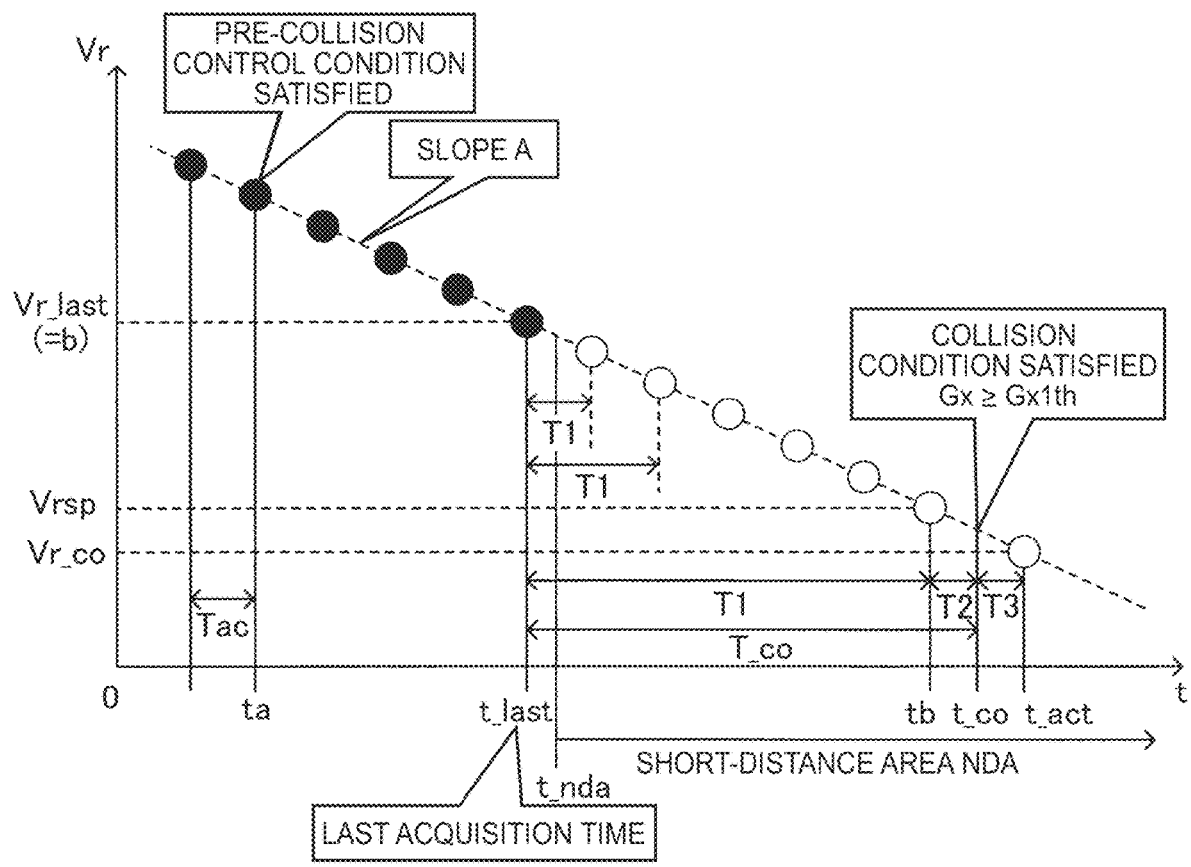
FIG. 3 is a diagram showing an outline of the processing of the present control device.

The outline of the present control device is described with reference to FIG. 3. The CCECU 10 performs the pre-collision control processing, which will be described later, every time a predetermined first predetermined time Tac (see FIG. 3) elapses. At the same time, the CCECU 10 performs the collision-time control processing, which will be described later, every time a predetermined second predetermined time Tbc (not shown), which is less than the first predetermined time Tac, elapses.

Pre-Collision Control Processing

In the pre-collision control processing, the CCECU 10 acquires the radar target information and the camera target information and, based on the radar target information and the camera target information that have been acquired, determines whether the pre-collision control condition is satisfied. As will be described later, the pre-collision control condition is a condition that is satisfied when there is a target that is highly likely to collide with the vehicle VA (hereinafter referred to as "collision target"). When it is determined that the pre-collision control condition is satisfied, the CCECU 10 performs the pre-collision control for avoiding the collision by decelerating the vehicle VA.

Collision-Time Control Processing

The CCECU 10 acquires the floor acceleration Gx and determines whether "the collision condition that the floor acceleration Gx is equal to or more than the first threshold acceleration Gx1th" is satisfied. After the time at which it is determined that the collision condition is satisfied (hereinafter referred to as "collision time t_co"; see FIG. 3), the CCECU 10 determines whether the collision control condition is satisfied. This collision control condition is satisfied when both conditions A1 and A2 described below are satisfied. When it is determined that the collision control condition is satisfied, the CCECU 10 performs the collision-time control in which the airbags 42a to 42f are inflated.

Condition A1: The relative velocity Vr_co of the collision target at the collision time t_co (hereinafter referred to as collision-time estimated relative velocity) is equal to or more than the collision threshold velocity Vr2th. Condition A2: The floor acceleration Gx is equal to or more than the second threshold acceleration Gx2th that is more than the first threshold acceleration Gx1th.

Note that, at the collision time t_co and immediately before the collision time t_co, the collision target exists in the short-distance area NDA. Therefore, the millimeter wave radar device 12 cannot detect the collision target. In other words, the millimeter wave radar device 12 cannot acquire the relative velocity Vr of the collision target. For this reason, the CCECU 10 needs to estimate the collision-time estimated relative velocity Vr_co.

Therefore, in the pre-collision control processing performed in the period from the "time to when pre-collision control condition is satisfied" to the "time t_nda when the collision target enters the short-distance area NDA", the CCECU 10 calculates the slope a of the relative velocity Vr of the collision target with respect to time.

After that, in the pre-collision control processing that is performed after the time t_nda that is the time when the collision target has entered the short-distance area NDA, the CCECU 10 estimates the relative velocity Vr of the collision target (hereinafter referred to as "estimated relative velocity Vrs") based on the slope a and the following equation (1).

$$Vrs = a*T1 + b \quad (1)$$

wherein

"T1": Elapsed time from the last acquisition time t_last (see FIG. 3), which is the time when the radar target information on the collision target was last acquired in pre-collision control processing, to the current time "b": Relative velocity Vr at the last acquisition time t_last (hereinafter, referred to as "last acquired relative velocity Vr_last")

When it is determined that the collision condition is satisfied at time t_co, the CCECU 10 estimates, in the collision-time control processing, the collision-time estimated relative velocity Vr_co according to the following equation (2).

$$Vr\_co = a*(T2+T3) + Vrsp \quad (2)$$

wherein

"T2": Time from the time (last acquisition time) tb when the pre-collision control processing was performed immediately before the time t_co (see FIG. 3) to the time t_co "T3": Delay time that is set in advance considering the period of time from the time when the millimeter wave radar device 12 sends the radar target information to the CCECU 10 to the time when the CCECU 10 receives the radar target information (that is, the period of time required for the CCECU 10 to acquire the latest radar target information from the millimeter wave radar device 12)

"Vrsp": Estimated relative velocity Vrs estimated at immediately preceding acquisition time tb As understood from the above description, the CCECU 10 estimates the estimated relative velocity Vrs of a collision target existing in the short-distance area NDA based on "the slope a that is based on the history of the relative velocity Vr when the collision target existed in the detectable area DA". Therefore, a more accurate estimated relative velocity Vrs can be estimated. Furthermore, since the collision-time estimated relative velocity Vr_co is estimated based on the slope a, the CCECU 10 can estimate a more accurate collision-time estimated relative velocity Vr_co. Furthermore, since an accurate collision-time estimated relative velocity Vr_co can be estimated, the CCECU 10 can accurately determine whether the above-described condition A1 is satisfied. As a result, the CCECU 10 can appropriately determine whether to perform the collision-time control.

Specific Operation

Pre-Collision Control Routine

Figure 4:
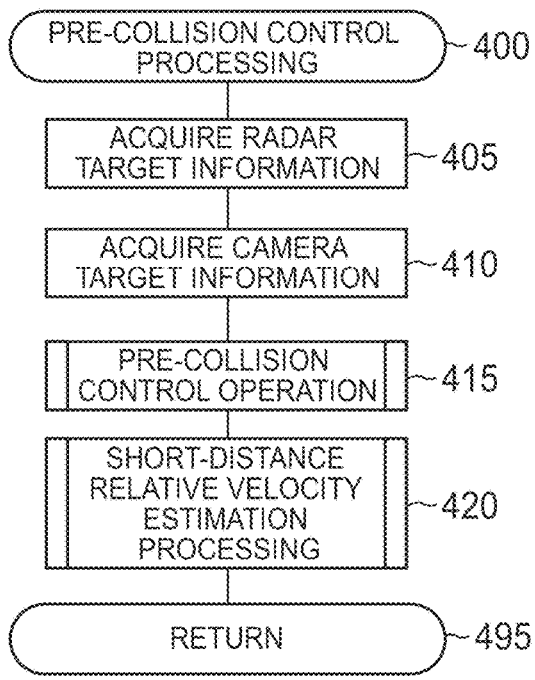
FIG. 4 is a flowchart showing a routine performed by the CPU of the collision control ECU (CCECU) shown in FIG. 1.

The CPU of the CCECU 10 (hereinafter, "CPU" refers to the CPU of the CCECU 10 unless otherwise specified) performs the pre-collision control routine, shown by the flowchart in FIG. 4, every time the first predetermined time Tac elapses.

Therefore, at a predetermined time, the CPU starts processing from step 400, performs steps 405 to 420 in this order, and causes the processing to proceed to step 495 to end the current processing of this routine.

Step 405: The CPU acquires the radar target information from the millimeter wave radar device 12. Step 410: The CPU acquires the camera target information from the camera device 14. Step 415: When the pre-collision control condition, which will be described later, is satisfied, the CPU performs the pre-collision control operation processing (see FIG. 5) to perform the pre-collision control. Step 420: When the collision target (the target that has caused the pre-collision control to be performed) enters the short-distance area NDA while the pre-collision control is being performed, the CPU performs the short-distance relative velocity estimation processing to estimate the relative velocity Vrs of the collision target (see FIG. 6).

Pre-Collision Control Operation Routine

Figure 5:
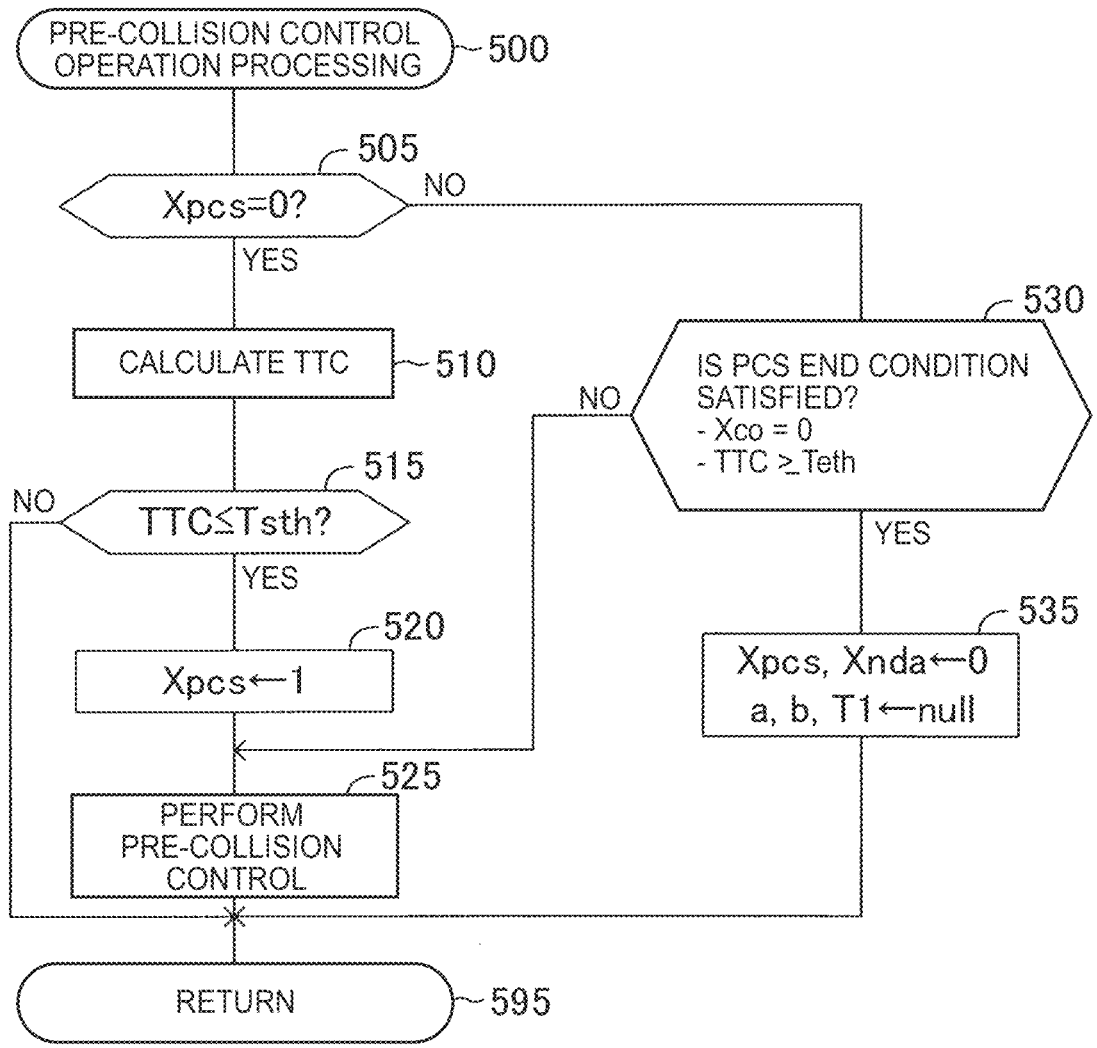
FIG. 5 is a flowchart showing a subroutine that the CPU of the CCECU shown in FIG. 1 performs in the routine shown in FIG. 4.

When the processing proceeds to step 415, the CPU performs the subroutine shown by the flowchart in FIG. 5. That is, the CPU starts processing from step 500 shown in FIG. 5 and, in step 505, determines whether the value of the pre-collision control flag Xpcs is "0".

The value of the pre-collision control flag Xpcs is set to "1" when the CPU starts the pre-collision control (see step 520) and is set to "0" when the CPU ends the pre-collision control. (see step 535). The CPU sets the value of the pre-collision control flag Xpcs to "0" in the initial routine that is performed when the ignition key switch (not shown) of the vehicle VA is changed from the off position to the on position.

When the value of the pre-collision control flag Xpcs is "0", the CPU determines that the result of step 505 is "Yes" and causes the processing to proceed to step 510 to calculate the Time-To-Collision (TTC, sometimes referred to as "collision delay time") that is the time estimated for each target to collide with the vehicle VA. More specifically, the CPU calculates the TTC by substituting the target distance L and the relative velocity Vr of the target into the following equation (3).

$$TTC = L/Vr \qquad (3)$$

Next, the CPU causes the processing to proceed to step 515 to determine whether the pre-collision control condition that the TTC is equal to or less than the threshold time Tsth is satisfied. When there is a plurality of targets (that is, when a plurality of TTCs is calculated), the CPU determines whether the minimum TTC is equal to or less than the threshold time Tsth.

When the TTC is more than the threshold time Tsth (that is, when the pre-collision control condition described above is not satisfied), the CPU determines that the result of step 515 is "No" and causes the processing to proceed to step 595 to end the current processing of this routine.

On the other hand, when the TTC is equal to or less than the threshold time Tsth (that is, when the pre-collision control condition is satisfied), the CPU determines that the result of step 515 is "Yes", performs steps 520 and 525 in this order, and causes the processing to proceed to step 595 to end the current processing of this routine.

Step 520: The CPU sets the value of the pre-collision control flag Xpcs to "1". Step 525: The CPU performs the pre-collision control described below.

Step 525 is described below in more detail. The CPU sends the predetermined PCS required deceleration Gpcs to the engine ECU 20 and the brake ECU 30. When the PCS required deceleration Gpcs is received, the engine ECU 20 sets the target throttle valve opening degree TAtgt to "0" regardless of the accelerator pedal operation amount. The brake ECU 30 controls the brake actuator 36 based on the larger one of the operation required deceleration Gbpd and the PCS required deceleration Gpcs.

On the other hand, when the value of the pre-collision control flag Xpcs is "1" in step 505, the CPU determines that the result of step 505 is "No" and causes the processing to proceed to step 530 to determine whether the PCS end condition is satisfied. The PCS end condition is a condition that is satisfied when the value of the collision flag Xco, which will be described later, is "0" and the TTC is equal to or more than the threshold time Teth. The threshold time Teth is set to a value more than the threshold time Tsth.

The value of the collision flag Xco is set to "1" when the collision condition described above is satisfied (see step 718 shown in FIG. 7) and is set to "0" when the predetermined post-collision time has elapsed from the time the collision condition is satisfied (see step 750 shown in FIG. 7). Note that the CPU sets the value of the collision flag Xco to "0" in the initial routine.

When the end condition is not satisfied, the CPU determines that the result of step 530 is "No" and causes the processing to proceed to step 525. On the other hand, when the end condition is satisfied, the CPU determines that the result of step 530 is "Yes" and causes the processing to proceed to step 535. In step 535, the CPU sets the value of the pre-collision control flag Xpcs and the value of the short-distance area flag Xnda, which will be described later, to "0" and, at the same time, sets the values of the "slope a, intercept b, and timer T1", which will be described later, to an invalid value "null". After that, the CPU causes the processing to proceed to step 595 to end the current processing of this routine.

Short-Distance Relative Velocity Estimation Routine

Figure 6:
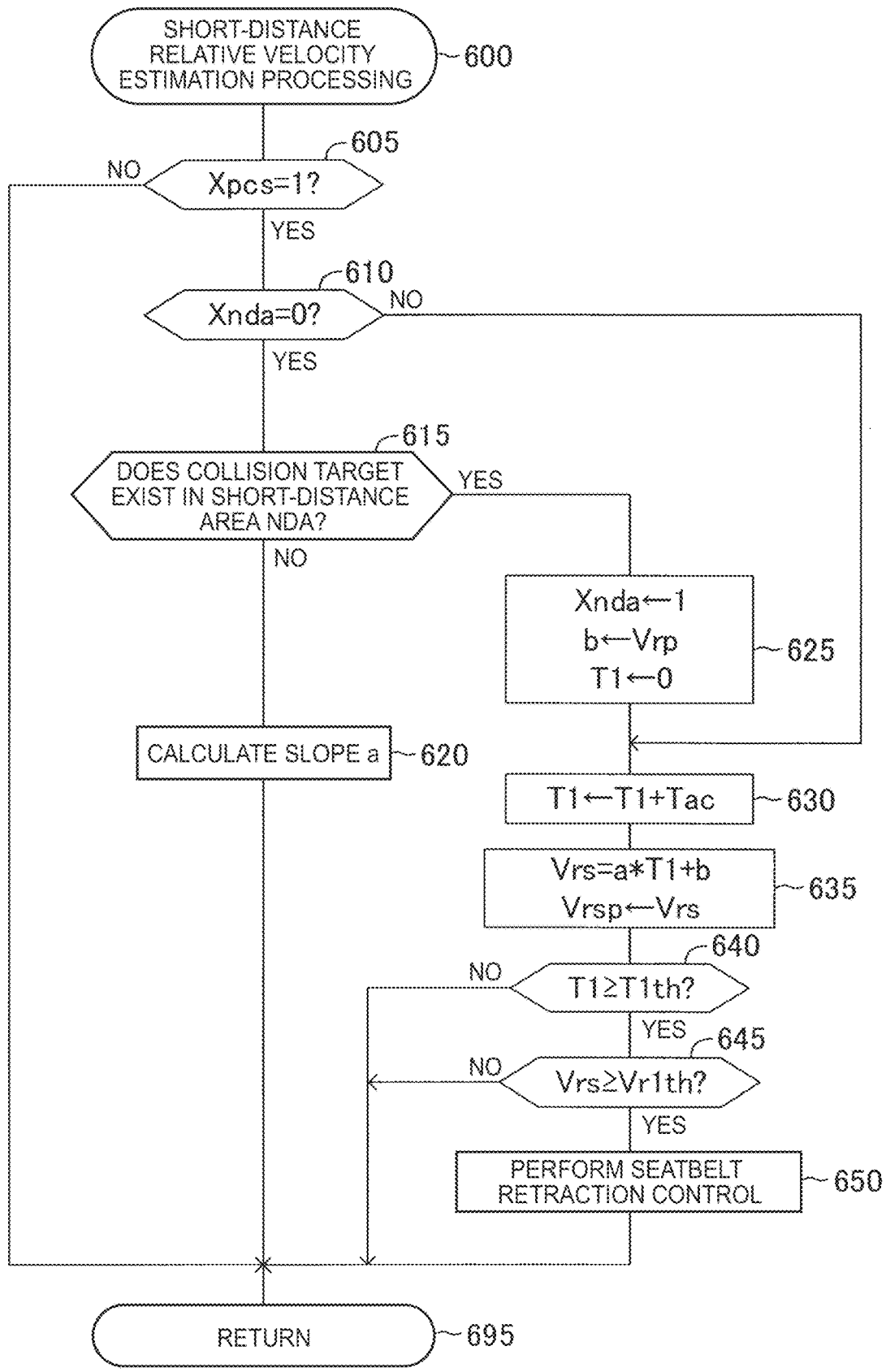
FIG. 6 is a flowchart showing another subroutine that the CPU of the CCECU shown in FIG. 1 performs in the routine shown in FIG. 4.

When the processing proceeds to step 420, the CPU performs the subroutine shown by the flowchart in FIG. 6.

That is, the CPU starts processing from step 600 shown in FIG. 6 and, in step 605, determines whether the value of the pre-collision control flag Xpcs is "1". When the value of the pre-collision control flag Xpcs is "0", the CPU determines that the result of step 605 is "No" and causes the processing to proceed to step 695 to end the current processing of this routine.

On the other hand, when the value of the pre-collision control flag Xpcs is "1", the CPU determines that the result of step 605 is "Yes" and causes the processing to proceed to step 610 to determine whether the value of the short-distance area flag Xnda is "0".

The value of the short-distance area flag Xnda is set to "1" when the pre-collision control is being performed and when it is determined that the collision target exists in the short-distance area NDA (see step 625), and is set to "0" when the pre-collision control ends (see step 535 shown in FIG. 5). Furthermore, the CPU sets the value of the short-distance area flag Xnda to "0" in the initial routine.

When the value of the short-distance area flag Xnda is "0", the CPU determines that the result of step 610 is "Yes" and causes the processing to proceed to step 615 to determine whether the collision target exists in the short-distance area NDA. More specifically, the CPU determines whether the short-distance non-detection condition described below is satisfied. When the CPU determines that the short-distance non-detection condition is satisfied, the CPU determines that the collision target exists in the short-distance area NDA. The short-distance non-detection condition is satisfied when in the following case. That is, the millimeter wave radar device 12 does not detect the collision target near the estimated position of the collision target that is estimated based on the collision target's history of "positions included in the radar target information". This history has been obtained in the first period from the time when the pre-collision control condition was satisfied to the time when this routine was last executed (that is, to the time earlier than the current time by the first predetermined time Tac). Note that the position of the collision target is the "relative position with respect to the vehicle VA" determined based on the radar target information alone or based on both the radar target information and the camera target information.

The short-distance non-detection condition may be a condition that is satisfied in the following case. The same target as the target for which the pre-collision control condition was satisfied is included in the front image, but the radar target information corresponding to that target cannot be obtained.

When the short-distance non-detection condition is not satisfied, there is a high possibility that the collision target exists in the detectable area DA. Therefore, in this case, the CPU determines that the result of step 615 is "No" and causes the processing to proceed to step 620. In step 620, based on "the relative velocity Vr of a plurality of collision targets" obtained in the first period, the CPU calculates (estimates) "the slope a of the relative velocity of the collision target with respect to the time". This slope a is estimated, for example, by the line approximation of the points, determined by the relative velocity Vr and the time at which the relative velocity Vr was obtained, by using the least squares method. After that, the CPU causes the processing to proceed to step 695 to end the current processing of this routine.

On the other hand, when the processing of the CPU proceeds to step 615 and the short-distance non-detection condition is satisfied, the CPU determines that the collision target exists in the short-distance area NDA and determines that the result of step 615 is "Yes". Then, the CPU performs the processing of steps 625 to 635 in this order and causes the processing to proceed to step 640.

Step 625: The CPU sets the value of the short-distance area flag Xnda to "1", sets the intercept b to the "relative velocity Vr_last of the last detected collision target (last acquired relative velocity Vr_last)", and sets the timer T1 to "0".

Step 630: The CPU adds a first predetermined time Tac to the timer T1.

Step 635: The CPU calculates (estimates) the estimated relative velocity Vrs by applying the value of the slope a, the value of the timer T1, and the value the intercept b to the above equation (1). In addition, the CPU stores the estimated relative velocity Vrs in the RAM as the estimated relative velocity Vrsp that is included in the equation (2) described above. Step 640: The CPU determines whether the value of the timer T1 is equal to or more than the first threshold time T1th.

When the value of the timer T1 is less than the predetermined first threshold time T1th, the CPU determines that the result of step 640 is "No" and causes the processing to proceed to step 695 to end the current processing of this routine. The first threshold time T1th is set to a value sufficiently less than the time from the time when the collision target enters the short-distance area NDA (when the short-distance non-detection condition is satisfied) to the time when it is estimated that the collision target will actually collide with the vehicle VA.

When this state continues, the CPU determines that the result of step 605 is "Yes", determines that the result of step 610 is "No", and causes the processing to proceed to step 630 the next time the CPU performs this routine. When such processing is repeated, the value of the timer T1 is gradually increased by the processing in step 630.

Therefore, when the processing of the CPU proceeds to step 640 after the value of the timer T1 has become equal to or more than the first threshold time T1th, the CPU determines that the result of step 640 is "Yes" and causes the processing to proceed to step 645. In step 645, the CPU determines whether the estimated relative velocity Vrs is equal to or more than the retraction threshold speed Vr1th. When the estimated relative velocity Vrs is less than the retraction threshold velocity Vr1th, the CPU determines that the result of step 645 is "No" and causes the processing to proceed to step 695 to end the current processing of this routine.

On the other hand, when the estimated relative velocity Vrs is equal to or more than the retraction threshold speed Vr1th, the CPU determines that the result of step 645 is "Yes", performs the seatbelt retraction control in step 650, and causes the processing to proceed to step 695 to end the current processing of this routine. More specifically, in the processing in step 650, the CPU sends the retraction signal to each of the seatbelt actuators 50a to 50d. In response to the retraction signal, each of the seatbelt actuators 50a to 50d retracts the corresponding the seatbelt, 52a to 52d, by a predetermined amount.

As described above, when the collision target has entered the short-distance area NDA and, after that, a predetermined time (first threshold time T1th) has elapsed from the time the collision target entered this area but when the estimated relative velocity Vrs is equal to or more than the retraction threshold speed Vr1th, it can be determined that the possibility of collision between the vehicle VA and the collision target is extremely high. Therefore, the CPU performs the seatbelt retraction control.

Collision-Time Control Routine

Figure 7:
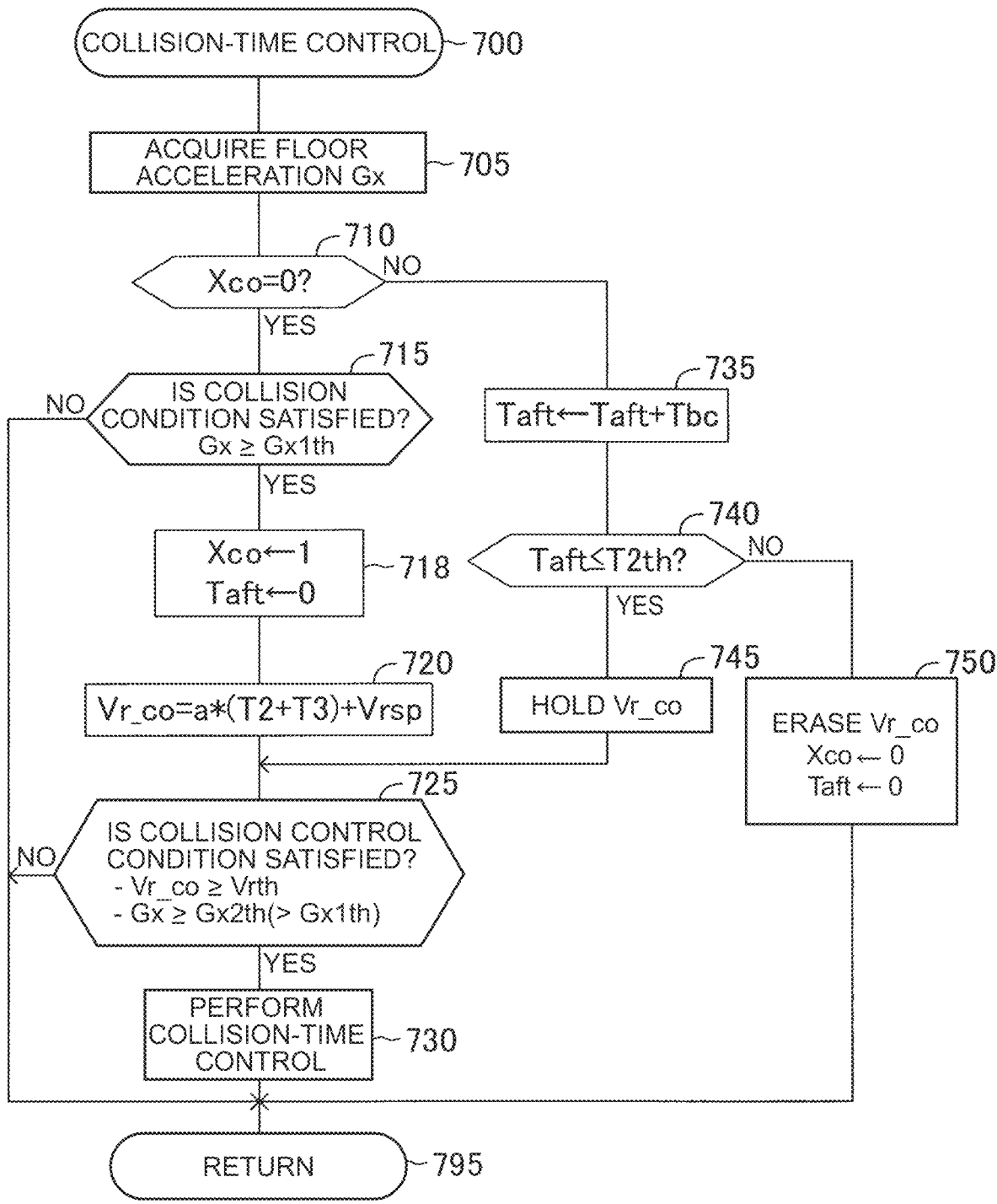
FIG. 7 is a flowchart showing still another routine that the CPU of the CCECU shown in FIG. 1 performs.

The CPU executes the collision-time control routine, shown by the flowchart in FIG. 7, every time the second predetermined time Tbc elapses.

Therefore, at a predetermined time, the CPU starts processing from step 700 and causes the processing to proceed to step 705 to acquire the floor acceleration Gx from the floor sensor 16. Next, the CPU causes the processing to proceed to step 710 to determine whether the value of the collision flag Xco is "0".

When no collision has occurred up to the current time, the value of the collision flag Xco is "0". In this case, the CPU determines that the result of step 710 is "Yes" and causes the processing to proceed to step 715 to determine whether the above collision condition (that is, Gx≥Gx1th) is satisfied. When the collision condition is not satisfied, the CPU determines that the result of step 715 is "No" and causes the processing to proceed to step 795 to end the current processing of this routine.

On the other hand, when the collision condition is satisfied, the CPU determines that the result of step 715 is "Yes" and performs the processing in steps 718 and step 720 in this order.

Step 718: The CPU sets the value of the collision flag Xco to "1" and, at the same time, sets the value of the timer Taft to "0". Step 720: The CPU calculates the collision-time estimated relative velocity Vr_co according to the equation (2) described above (that is, Vr_co=a*(T2+T3)+Vrsp . . . (2)), and stores the calculated collision-time estimated relative velocity Vr_co in the RAM.

The values of the variables on the right side of the above equation (2) are as follows.

Slope a: Slope a calculated in step 620 in FIG. 6
Time T2: Time based on the value of the execution timer indicating the elapsed time from the processing time of step 635 performed last before the processing of step 720 is executed. The CPU increments the value of the execution timer every time a very short unit time elapses and, when the value of the execution timer reaches the threshold value representing the first predetermined time Tac, starts the processing of the pre-collision control routine shown in FIG. 4 and, at the same time, initializes the value of the execution timer.
Time T3: Predetermined fixed time (delay time)
Estimated relative velocity Vrsp: Estimated relative velocity Vrs stored last in the RAM in step 635 in FIG. 6 before the time when the process of step 720 is executed Next, the CPU causes the processing to proceed to step 725 to determine whether the collision control condition described above (conditions A1 and A2) is satisfied.

When the collision control condition described above is not satisfied, the CPU determines that the result of step 725 is "No" and causes the processing to proceed to step 795 to end the current processing of this routine.

On the other hand, when the collision control condition described above is satisfied, the CPU determines that the result of step 725 is "Yes", performs the collision-time control in step 730, and causes the processing to proceed to step 795 to end the current processing of this routine. More specifically, in step 730, the CPU sends the airbag inflation signal to each of the airbag actuators 40a to 40f. In response to the airbag inflation signal, each of the airbag actuators 40a to 40f inflates the corresponding airbag, 42a to 42f, by activating the corresponding inflator.

On the other hand, when the value of the collision flag Xco is "1" in step 710, the CPU determines that the result of that step 710 is "No" and causes the processing to proceed to steps 735 and 740 described below to perform the processing in those steps.

Step 735: The CPU adds the second predetermined time Tbc to the value of the timer Taft. As a result, the value of the timer Taft becomes the value representing the elapsed time from the time when the collision condition was satisfied.

Step 740: The CPU determines whether the value of the timer Taft is equal to or less than the second threshold time T2th. The second threshold time T2th is set to the value corresponding to the length of time from the time when the collision occurred to the time when there is no longer a need to perform the collision-time control.

When the value of the timer Taft is equal to or less than the second threshold time T2th (that is, when the predetermined post-collision time has not yet elapsed since the time when the collision condition was satisfied), the CPU determines that the result of step 740 is "Yes", holds the collision-time estimated relative velocity Vr_co in step 745, and causes the processing to proceed to step 725. In step 725, using the collision-time estimated relative velocity Vr_co held in step 745, the CPU determines whether the condition A1 is satisfied. Since the millimeter wave radar device 12 may have failed due to an impact when the collision condition was satisfied and, as a result, an abnormal value may be sent to the CCECU 10, the CPU determines the condition A1 using the collision-time estimated relative velocity Vr_co at the time when the collision condition was satisfied instead of sequentially calculating the collision-time estimated relative velocity Vr_co.

On the other hand, when the value of the timer Taft is more than the second threshold time T2th when the CPU causes the processing to proceed to step 740 (that is, when the predetermined post-collision time has elapsed since the time when the collision condition was satisfied), the CPU determines that the result of step 740 is "No" and causes the processing to proceed to step 750.

In step 750, the CPU erases the collision-time estimated relative velocity Vr_co from the RAM, sets the value of the collision flag Xco to "0", and sets the value of the timer Taft to "0".

As understood from the above description, when a collision target exists in the short-distance area NDA, the CCECU 10 estimates the estimated relative velocity Vrs based on the slope a of the relative speed Vr when the collision target existed in the detectable area DA. This makes it possible to accurately estimate the relative velocity of the collision target existing in the short-distance area NDA.

The present disclosure is not limited to the embodiment described above and various modifications of the present disclosure may be used. For example, in step 705 shown in FIG. 7, the CPU may acquire the pressure P from the pressure sensor 18 instead of acquiring the floor acceleration Gx. In this case, in step 715, the CPU determines whether the collision condition that the pressure P is equal to or more than the first threshold pressure P1th is satisfied. In addition, instead of determining whether the condition A2 is satisfied, the CPU determines in step 725 whether the pressure P is equal to or more than the second threshold pressure P2th that is more than first threshold pressure P1th.

In step 730, the CPU may perform the hood lifting control as the collision-time control by operating the pop-up hood lifters 60a to 60d. In this case, the CPU sends the operation signal to each of the pop-up hood lifters 60a to 60d. In response to the operation signal, each of the pop-up hood lifters 60a to 60d operates to lift the hood.

In step 720, the CPU may estimate the collision-time estimated relative velocity Vr_co according to the following equation (4).

$$Vr\_co = a*(T1+T2+T3)+Vr\_last \quad (4)$$

In either of the above equations (2) and (4), the collision-time estimated relative velocity Vr_co is calculated based on the slope a, the last acquired relative velocity Vr_last, and the sum of the elapsed time (T1+T2) from the last acquisition time t_last to the collision time and the delay time T3.

The millimeter wave radar device 12 may be any remote sensing device (target detection sensor) that can send a wireless medium instead of a millimeter wave and detect a target by receiving the reflected wireless medium.

The CPU can identify the distance L and the direction of a target existing in the short-distance area NDA based on the camera target information, but cannot identify the relative velocity Vr based on the camera target information. Therefore, the short-distance area NDA is an area in which at least the relative velocity Vr, one of the three pieces of information (target distance L, relative velocity Vr, and direction) on a target for detecting the target, is not detected.

The floor sensor 16 and the pressure sensor 18 are sensors that detect an impact index value (floor acceleration Gx and pressure P) representing an impact force acting on the vehicle. Instead of the floor sensor 16 and the pressure sensor 18, any other sensor capable of detecting the impact index value may be used.

What is claimed is:

1. A vehicle control device comprising:
a target detection sensor, provided at a predetermined position on a vehicle, that is configured to be able to detect both a distance between a target and the vehicle and a relative velocity of the target with respect to the vehicle when the target exists in a detectable area and that is not able to detect at least the relative velocity of the target with respect to the vehicle when the target exists in a short-distance area, the detectable area being a part of a predetermined area around the vehicle and being equal to or more than a predetermined minimum detection distance from the predetermined position and less than a predetermined maximum detection distance that is more than the minimum detection distance, the short-distance area being less than the minimum detection distance from the predetermined position; and
a control device configured to control an operation of actuators mounted on the vehicle, wherein
the control device is configured to
acquire the distance and the relative velocity of the target existing in the detectable area from the target detection sensor every time a predetermined time elapses,
calculate a time rate of change corresponding to a change amount per unit time of the relative velocity of the target based on a history of the acquired relative velocity,
calculate a current-time relative velocity of the target that has entered the short-distance area with respect to the vehicle as an estimated relative velocity when the target positioned in the detectable area has entered the short-distance area, the estimated relative velocity being calculated based on an elapsed time from a last acquisition time to the current time wherein the last acquisition time is a time when the relative velocity of the target detected by the target detection sensor was last acquired from the target detection sensor, a last acquired relative velocity that is the relative velocity of the target acquired from the target detection sensor at the last acquisition time, and the time rate of change, and control the operation of the actuators based on the estimated relative velocity.

2. The vehicle control device according to claim 1, wherein when a collision condition that is satisfied when a possibility that the target and the vehicle will collide is high is satisfied, the control device is configured to calculate the estimated relative velocity as a collision-time estimated relative velocity based on the time rate of change, the last acquired relative velocity, and a time from the last acquisition time to a collision time when the collision condition was satisfied, and determine whether to operate the actuators based on the collision-time estimated relative velocity.

3. The vehicle control device according to claim 2, wherein when the collision condition is determined to be satisfied, the control device is configured to calculate the collision-time estimated relative velocity based on the time rate of change, the last acquired relative velocity, the time from the last acquisition time to the collision time when the collision condition was satisfied, and a delay time required to acquire a latest value of the distance and a latest value of the relative velocity from the target detection sensor.

4. The vehicle control device according to claim 2, further comprising an impact detection sensor for detecting an impact index value indicating an impact force acting on the vehicle, wherein the control device is configured to determine that the collision condition is satisfied when the impact index value is equal to or more than a first threshold.

5. The vehicle control device according to claim 4, wherein when the collision-time estimated relative velocity is more than a predetermined threshold speed and, after the collision time, the impact index value becomes equal to or more than a second threshold value that is more than the first threshold value, the control device is configured to operate inflators that activate airbags mounted on the vehicle as the actuators.

* * * * *